US011370161B2

(12) United States Patent
Abe et al.

(10) Patent No.: US 11,370,161 B2
(45) Date of Patent: Jun. 28, 2022

(54) AIR FLOW CONTROLLER AND MANUFACTURING METHOD OF STRETCHED FILM

(71) Applicant: Toray Industries, Inc., Tokyo (JP)

(72) Inventors: Ryuta Abe, Mishima (JP); Toru Nishikawa, Otsu (JP)

(73) Assignee: Toray Industries, Inc.

( * ) Notice: Subject to any disclaimer, the term of this patent is extended or adjusted under 35 U.S.C. 154(b) by 194 days.

(21) Appl. No.: 16/497,158

(22) PCT Filed: Mar. 15, 2018

(86) PCT No.: PCT/JP2018/010340
§ 371 (c)(1),
(2) Date: Sep. 24, 2019

(87) PCT Pub. No.: WO2018/180565
PCT Pub. Date: Oct. 4, 2018

(65) Prior Publication Data
US 2020/0108547 A1   Apr. 9, 2020

(30) Foreign Application Priority Data
Mar. 28, 2017   (JP) .............................. JP2017-062364

(51) Int. Cl.
*B29C 55/28*   (2006.01)
*B29C 35/04*   (2006.01)
(Continued)

(52) U.S. Cl.
CPC ............ *B29C 55/28* (2013.01); *B29C 35/045* (2013.01); *B29C 55/085* (2013.01); *B29C 55/20* (2013.01);
(Continued)

(58) Field of Classification Search
CPC ...... B29C 55/28; B29C 35/045; B29C 55/085; B29C 55/20; B29C 2035/046;
(Continued)

(56) References Cited

U.S. PATENT DOCUMENTS 4,104,769 A * 8/1978 Levy ....................... B29C 55/02
26/92
4,378,207 A   3/1983 Smith
8,220,180 B2   7/2012 Inoue et al.
(Continued)

FOREIGN PATENT DOCUMENTS

CN   103442879 A   12/2013
GB      2175245 A   11/1986
(Continued)

OTHER PUBLICATIONS

International Search Report and Written Opinion for International Application No. PCT/JP2018/010340, dated May 15, 2018, 6 pages.
(Continued)

*Primary Examiner* — Jeffrey M Wollschlager
(74) *Attorney, Agent, or Firm* — RatnerPrestia

(57) ABSTRACT

An air flow controller includes: a box-shaped body cover that is disposed above and/or below a film running surface to be adjacent to an upstream side of an entrance of a tenter oven in a film running direction and/or a downstream side of an exit of the tenter oven in the film running direction, the box-shaped body cover extending in the film running direction and having a surface facing the film running surface and being open. The box-shaped body cover includes at least one partition structural body in the box-shaped body cover, the partition structural body extending in a width direction of the film and separating inside of the box-shaped body cover into a plurality of chambers, and each of at least two of the
(Continued)

chambers is provided with an air discharge mechanism configured to discharge air in a corresponding chamber.

12 Claims, 5 Drawing Sheets

(51) Int. Cl.
  *B29C 55/08* (2006.01)
  *B29C 55/20* (2006.01)
  *B29K 101/12* (2006.01)
  *B29L 7/00* (2006.01)
(52) U.S. Cl.
  CPC .... *B29C 2035/046* (2013.01); *B29K 2101/12* (2013.01); *B29L 2007/008* (2013.01)
(58) Field of Classification Search
  CPC ............... B29C 55/12; B29K 2101/12; B29L 2007/008; F27D 7/02; F27D 7/06
  See application file for complete search history.

(56) References Cited

U.S. PATENT DOCUMENTS

| | | | |
|---|---|---|---|
| 9,314,960 B2 | 4/2016 | Hatakeyama et al. | |
| 9,522,488 B2 | 12/2016 | Lee et al. | |
| 2005/0012239 A1 | 1/2005 | Nakashima | |
| 2008/0075894 A1* | 3/2008 | Otoshi | B29C 55/08 428/1.6 |
| 2009/0115100 A1* | 5/2009 | Nakai | B29C 55/08 264/291 |
| 2010/0002297 A1* | 1/2010 | Shibuya | B29C 41/28 359/485.01 |
| 2010/0059036 A1* | 3/2010 | Inoue | B29C 55/165 126/21 R |
| 2010/0112291 A1* | 5/2010 | Nakai | G02B 5/0268 428/156 |
| 2014/0013612 A1* | 1/2014 | Lee | B29C 55/08 34/202 |
| 2015/0048540 A1* | 2/2015 | Hatakeyama | B29D 7/01 264/165 |
| 2018/0083245 A1* | 3/2018 | Nakazawa | B29C 55/12 |
| 2018/0311866 A1 | 11/2018 | Nishikawa et al. | |

FOREIGN PATENT DOCUMENTS

| | | | |
|---|---|---|---|
| JP | 58016177 A | 1/1983 | |
| JP | 61263727 A | 11/1986 | |
| JP | 0387238 A | 4/1991 | |
| JP | 09193240 A | 7/1997 | |
| JP | 2003039543 A | 2/2003 | |
| JP | 2005008407 A | 1/2005 | |
| JP | 2005035097 A | 2/2005 | |
| JP | 2007001286 A | 1/2007 | |
| JP | 2008100456 A | 5/2008 | |
| JP | 2008238565 A | 10/2008 | |
| JP | 2009269268 A | 11/2009 | |
| JP | 2011167923 A | 9/2011 | |
| JP | 2012176344 A | 9/2012 | |
| JP | 2013256384 A | 12/2013 | |
| JP | 2018047693 A | 3/2018 | |
| WO | 2008114586 A1 | 9/2008 | |
| WO | 2012133152 A1 | 10/2012 | |
| WO | 2013140453 A1 | 9/2013 | |
| WO | 2017115654 A1 | 7/2017 | |

OTHER PUBLICATIONS

Extended European Search Report for European Application No. 18 775 583.0, dated February 5, 2021, 12 pages.
Chinese Office Action for Chinese Application No. 201880021292.3 dated Feb. 1, 2021, with translation, 15 pages.
European Communication Pursuant to Rule 164(1) EPC for European Application No. 18775583.0. dated Nov. 10, 2020, 15 pages.
Japanese Notice of Reasons for Refusal for Japanese Application No. 2018-515159, dated Oct. 5, 2021 with translation, 4 pages.

* cited by examiner

AIR FLOW CONTROLLER AND MANUFACTURING METHOD OF STRETCHED FILM

CROSS REFERENCE TO RELATED APPLICATIONS

This is the U.S. National Phase application of PCT/JP2018/010340, filed Mar. 15, 2018, which claims priority to Japanese Patent Application No. 2017-062364, filed Mar. 28, 2017, the disclosures of these applications being incorporated herein by reference in their entirety for all purposes.

FIELD OF THE INVENTION

The present invention relates to an air flow controller that is provided at an entrance or an exit of a tenter oven suitable for manufacturing a stretched film made of thermoplastic resin and a manufacturing method of a stretched film made of thermoplastic resin using the air flow controller.

BACKGROUND OF THE INVENTION

As for a manufacturing method of a stretched film made of thermoplastic resin, generally known is a sequential biaxial stretching method in which a uniaxially stretched film is obtained by stretching an unstretched film made of thermoplastic resin in its longitudinal direction using a tenter oven and thereafter the uniaxially stretched film is stretched in its width direction, or a simultaneous biaxial stretching method in which an upstretched film made of thermoplastic resin is simultaneously stretched in its longitudinal direction and its width direction. The stretched film made of thermoplastic resin obtained by either stretching method is more excellent in mechanical characteristics, thermal characteristics, electrical characteristics, and the like than an unstretched film made of thermoplastic resin. Such stretched films are widely used for various industrial material uses such as package uses by utilizing those characteristics.

The tenter oven, generally, has at least one process of a preheating process in which a film is heated up to a desired temperature, a stretching process in which the film is expanded to a desired width, a thermal fixation process in which the film is thermally treated at a desired temperature, and a cooling process in which the film is cooled down to a desired temperature. Film temperatures at the respective processes can be adjusted by blowing air preliminarily heated to respective desired temperatures to the film via blowing nozzles.

A phenomenon exists in which air flows in a film running direction due to a pressure difference between the exit and the entrance or between zones of the tenter oven, or an accompanying airflow of a running film. Such an airflow is called a machine direction (hereinafter, simply described as MD) flow. When the MD flow occurs, air having a different temperature flows from the exit and the entrance of the tenter oven in the tenter oven and mixes with heated air blown from the blowing nozzles in the tenter oven. As a result, unevenness of efficiency in heating the film occurs. Consequently, temperature unevenness in the film may occur. When the temperature unevenness in the film occurs, unevenness of characteristic and thickness in the film width direction occurs, causing deterioration of product quality. In addition to the deterioration of product quality, productivity may deteriorate due to breakage of the film in the tenter oven.

In addition, the occurrence of the MD flow in the tenter oven causes the following problems. Cold air may flow in the tenter oven from the outside of the tenter oven, thereby increasing energy consumption due to reheating of air cooled by inflow of cold air. When high temperature air inside the tenter oven is blown to the outside of the tenter oven, a surrounding temperature is increased. This may cause deterioration of a work environment around the tenter oven. In addition, when air having a high dust count of sublimate from the film is blown from the inside to the outside of the tenter oven, the sublimate pollutes a surrounding environment and the film surface. As a result, productivity may deteriorate due to the foreign material defects caused by the pollution.

The following techniques have been developed on addressing the described problems of the tenter oven. Patent Literature 1 describes a method in which an independent pressure adjustment chamber is provided for each of the entrance and the exit of a tenter oven so as to control a difference in pressure between the pressure adjustment chamber on the entrance side and the pressure adjustment chamber on the exit side.

Patent Literature 2 describes a stretching machine provided with plate-like buffer zones facing front and back surfaces of a film at an entrance or an exit of a tenter oven.

Patent Literature 3 describes a tenter oven including blocking plates that block fluid flowing from inside to outside a chamber included in the tenter oven, and the end of the blocking plate on a side adjacent to a film surface is tilted inside the chamber with respect to a film running direction.

Patent Literature 4 describes a method in which an air flow in parallel with a sheet surface is flowed from a nozzle that has a flat portion and a tilted portion provided next to the flat portion so as to prevent fluttering of a sheet. Patent Literature 4 describes the method described above that can reduce a gap between the film and the nozzle and has an effect of preventing input and output of heat at the entrance and exit of the tenter oven.

PATENT LITERATURE

Patent Literature 1: Japanese Patent Application Laid-open No. H03-87238
Patent Literature 2: Japanese Patent Application Laid-open No. 2009-269268
Patent Literature 3: Japanese Patent Application Laid-open No. 2011-167923
Patent Literature 4: Japanese Patent Application Laid-open No. 2005-8407

SUMMARY OF THE INVENTION

In the method described in Patent Literature 1, the pressure adjustment chambers provided at the entrance and the exit of the tenter oven are set such that the pressure in the pressure adjustment chamber on the exit side is larger than that in the pressure adjustment chamber on the entrance side to form an air flow directing from the pressure adjustment chamber on the exit side toward the pressure adjustment chamber on the entrance side. As a result, cold air entering from the entrance side of the tenter oven can be reduced and an amount of hot air leaked from the exit side of the tenter oven can be reduced. Air that is included in hot air leaked from the entrance side and has a high dust count due to sublimate from the film, however, pollutes a surrounding environment and a film surface. As a result, productivity may deteriorate due to the foreign material defects caused by the pollution. In addition, cold air entering from the exit side causes occurrence of unevenness of efficiency in heating the film. The temperature unevenness in the film may cause occurrence of unevenness of characteristics and thickness in the film width direction.

The plate-like buffer zones described in Patent Literature 2 and the blocking plates described in Patent Literature 3 reduce a flow rate of air flowing to the outside of the tenter oven by narrowing the opening of the tenter oven for running the film so as to increase fluid resistance. It is, however, necessary for producing sufficient fluid resistance to sufficiently reduce the opening area. This may cause the plate like buffer zones to touch with the film, thereby causing occurrence of a scratch on the film surface or occurrence of breakage of the film. As a result, film productivity may deteriorate.

In the method described in Patent Literature 4, air is blown in the film running direction so as to obtain force to suck the film, thereby increasing the MD flow. As a result, it is not expected to achieve the original heating performance of the blowing nozzle for heating the film inside the tenter oven.

The present invention aims to solve the conventional technical problems and provide an air flow controller that can not only reduce temperature unevenness of a film, manufacture a stretched film made of thermoplastic resin and having uniform characteristics and a uniform thickness in a film width direction, and reduce energy consumption necessary for heating the film up to a desired temperature and keeping the temperature, by preventing blowing in from the outside of a tenter oven, but also prevent that high temperature air inside the tenter oven blows to the outside, resulting in deterioration of a work environment around the tenter oven, and that air having a high dust count of sublimate from the film blows to the outside the tenter oven and pollutes a surrounding environment and a film surface, resulting in deterioration of productivity due to foreign material defects caused by the pollution.

A first air flow controller according to the present invention to solve the problems includes: a box-shaped body cover that is disposed above and/or below a film running surface to be adjacent to an upstream side of an entrance of a tenter oven in a film running direction and/or a downstream side of an exit of the tenter oven in the film running direction, the tenter oven including the entrance into which a film is conveyed and the exit from which the film is taken out, the box-shaped body cover extending in the film running direction and having a surface facing the film running surface and being open. The box-shaped body cover includes at least one partition structural body in the box-shaped body cover, the partition structural body extending in a width direction of the film and separating inside of the box-shaped body cover into a plurality of chambers, and each of at least two of the chambers is provided with an air discharge mechanism configured to discharge air in a corresponding chamber.

It is preferable that the first air flow controller according to the present invention includes any one of or all of the following configurations:
the air flow controller includes a mechanism configured to elevate and lower the partition structural body; and
the air flow controller includes a mechanism configured to extract and retract the box-shaped body cover and the partition structural body in the width direction of the film.

A second air flow controller according to the present invention to solve the problems includes: a plurality of chambers that are disposed above and/or below a film running surface to be adjacent to an upstream side of an entrance of a tenter oven in a film running direction and/or a downstream side of an exit of the tenter oven in the film running direction, the tenter oven including the entrance into which a film is conveyed and the exit from which the film is taken out, the chambers being arranged in the film running direction, each chamber having a surface facing the film running surface and being open, each chamber extending in a width direction of the film. The chambers are arranged without a gap between adjacent chambers when viewed from a side adjacent to the film running surface, and each of at least two of the chambers is provided with an air discharge mechanism configured to discharge air from inside of a corresponding chamber.

It is preferable that the second air flow controller according to the present invention includes any one of or all of the following configurations:
each chamber includes a mechanism configured to elevate and lower a part of the chamber facing an adjacent chamber; and
the air flow controller includes a mechanism configured to extract and retract the air flow controller in the width direction of the film.

In the first and second air flow controller according to the present invention, it is preferable that at least one of air discharge mechanisms includes a flow rate adjustment mechanism that is capable of adjusting a discharge flow rate independently from another air discharge mechanism of the air discharge mechanisms.

A manufacturing method of a stretched film according to the present invention to solve the problems includes: passing a film through a tenter oven and the air flow controller according to any of claims 1 to 7, the air flow controller being disposed to be adjacent to an upstream side of an entrance of the tenter oven in a film running direction and/or a downstream side of an exit of the tenter oven in the film running direction; at the air flow controller, discharging air inside the chamber by the air discharge mechanism; and at the tenter oven, stretching a running film while heating the running film.

In the manufacturing method of a stretched film according to the present invention, it is preferable that a discharge flow rate of the air discharge mechanism on an upstream side in an air flow is larger than a discharge flow rate of the air discharge mechanism on a downstream side in the air flow, the air flow being a flow that an air flows in the air flow controller when the film passes the air flow controller in a state where discharge of air by all of the air discharge mechanisms is stopped.

Examples of the thermoplastic resin used for forming the thermoplastic resin film processed by the tenter oven of the present invention include polyolefin resins such as polyethylene, polypropylene, and polymethylpentene, polyamide resins such as nylon 6 and nylon 66, polyester resins such as polyethylene terephthalate, polybutylene terephthalate, polyethylene-2,6-naphthalate, polymethylene terephthalate, polyethylene-p-oxybenzoate, poly-1,4-cyclohexylene dimethylene terephthalate, and copolymerized polyester containing, as copolymerization components, a diol component such as diethylene glycol, neopentyl glycol, or polyalkylene glycol, and a dicarboxylic acid component such as adipic acid, sebacic acid, phthalic acid, isophthalic acid, or 2,6-naphthalene dicarboxylic acid, polyacetal resins, and polyphenylene sulfide resins.

Particularly, in order to obtain the advantageous effect of the present invention more thoroughly, films made of polyolefin resins, polyamide resins, and polyester resins are preferable. Films made of polyethylene-2,6-naphthalate resins and polyethylene terephthalate resins are preferable among them. Particularly, films made of polyethylene terephthalate resins exhibit a high applicability of the present invention with wide ranging applications because of their inexpensiveness. These thermoplastic resins may be homogeneous resins or copolymerized or blended resins.

In addition to the thermoplastic resins described above, thermoplastic resin films may contain various generally known additives such as antioxidants, antistatic agents, crystal nucleating agents, inorganic particles, viscosity reducing agents, thermal stabilizers, and lubricants.

The air flow controller according to the present invention has the following advantageous effects.

The air flow controller prevents cold air from blowing in the tenter oven from the outside, thereby reducing temperature unevenness of the film in the tenter oven, and making it possible to manufacture a stretched film made of thermoplastic resin having uniform characteristics and a uniform thickness in the film width direction. The air flow controller can also reduce energy consumption for heating the film up to a desired temperature and keeping the temperature.

The air flow controller prevents high temperature air inside the tenter oven from blowing to the outside of the tenter oven, thereby making it possible to prevent that a temperature in the work area around the tenter oven is increased, resulting in deterioration of the work environment. The air flow controller can also prevent that air having a high dust count of sublimate from the film blows from the inside of the tenter oven to the outside and pollutes the surrounding environment and the film surface, resulting in deterioration of productivity due to foreign material defects caused by the pollution.

DETAILED DESCRIPTION OF EMBODIMENTS OF THE INVENTION

The following describes an embodiment according to the present invention in detail with reference to the accompanying drawings. The present invention is not limited to the embodiment.

Embodiment

Figure 1:
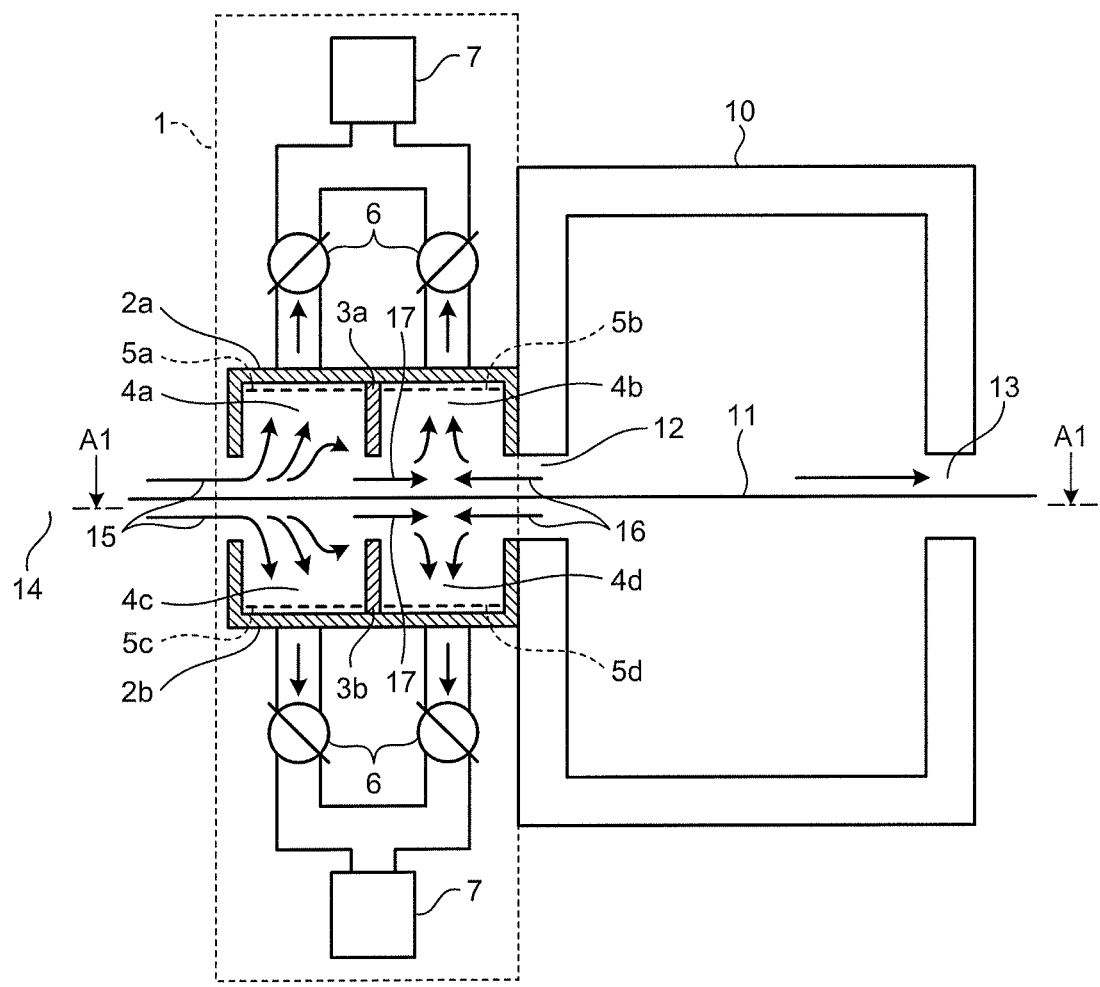
FIG. 1 is a schematic cross-sectional view of an air flow controller according to an embodiment of the present invention in a film running direction.
Figure 2:
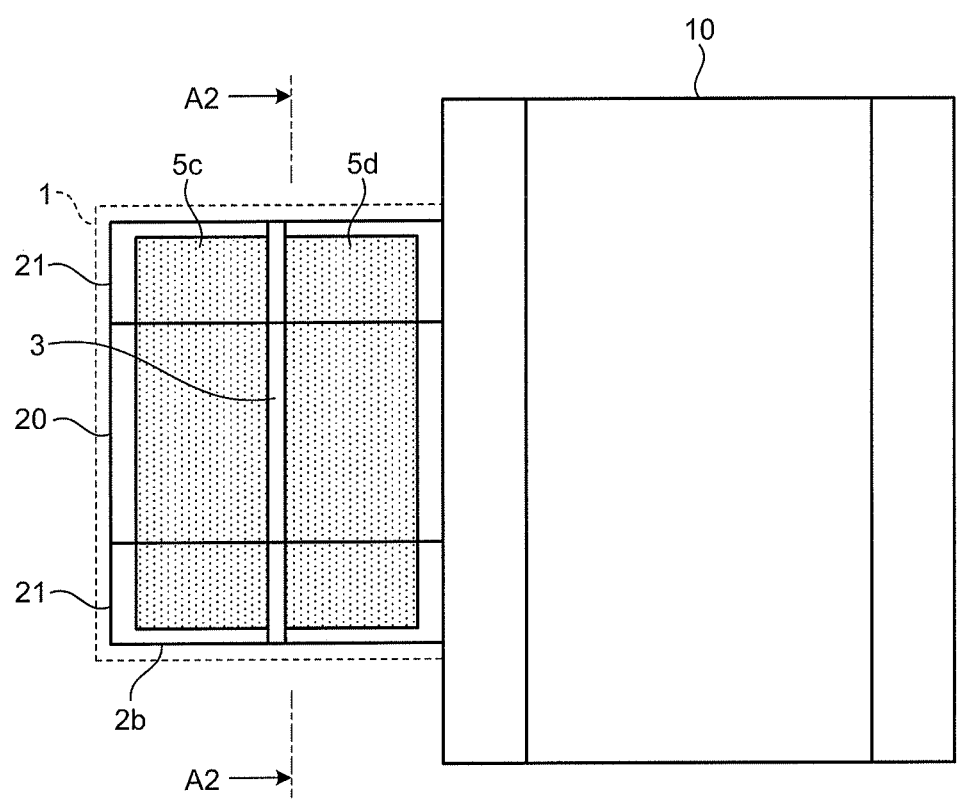
FIG. 2 is a schematic cross-sectional view of the air flow controller taken along line A1-A1 illustrated in FIG. 1.

An air flow controller according to an embodiment of the present invention is described with reference to FIGS. 1 and 2. FIG. 1 is a schematic cross-sectional view of the air flow controller according to the embodiment of the present invention in a film running direction. FIG. 1 is a cross-sectional view of the air flow controller by being cut with a plane perpendicular to a film running surface. FIG. 2 is a schematic cross-sectional view of the air flow controller taken along line A1-A1 illustrated in FIG. 1. A tenter oven 10 produces a stretched film by stretching an unstretched film in a uniaxial direction or two directions different from each other while the unstretched film is heated at a certain temperature. The unstretched film is gripped by clips, which are described later, and disposed on a film running surface 11. The unstretched film runs on the film running surface 11 by being stretched with the clips running on clip rails.

A thermoplastic resin film is exemplified as a film provided for the tenter oven 10. Examples of thermoplastic resin used for forming the thermoplastic resin film include polyolefin resins such as polyethylene, polypropylene, and polymethylpentene, polyamide resins such as nylon 6 and nylon 66, polyester resins such as polyethylene terephthalate, polybutylene terephthalate, polyethylene-2,6-naphthalate, polymethylene terephthalate, polyethylene-p-oxybenzoate, poly-1,4-cyclohexylene dimethylene terephthalate, and copolymerized polyester containing, as copolymerization components, a diol component such as diethylene glycol, neopentyl glycol, or polyalkylene glycol, and a dicarboxylic acid component such as adipic acid, sebacic acid, phthalic acid, isophthalic acid, or 2,6-naphthalene dicarboxylic acid, polyacetal resins, and polyphenylene sulfide resins.

Particularly, from the viewpoint of obtaining a high effect, films made of polyolefin resins, polyamide resins, and polyester resins are preferable. Films made of polyethylene-2,6-naphthalate resins and polyethylene terephthalate resins are preferable among them. Particularly, films made of polyethylene terephthalate resins exhibit a high applicability of the present invention with wide ranging applications because of their inexpensiveness. These thermoplastic resins may be homogeneous resins or copolymerized or blended resins.

In addition to the thermoplastic resins described above, thermoplastic resin films provided for the tenter oven 10 may contain various generally known additives such as antioxidants, antistatic agents, crystal nucleating agents, inorganic particles, viscosity reducing agents, thermal stabilizers, and lubricants.

An air flow controller 1 includes box-shaped body covers 2a and 2b that are disposed to be adjacent to an upstream side of the tenter oven 10 in the film running direction. The air flow controller 1 includes the box-shaped body cover 2a above the film running surface 11 and the box-shaped body cover 2b below the film running surface 11 such that the box-shaped body covers 2a and 2b face each other over the film running surface 11 interposed therebetween. The box-shaped body covers 2a and 2b each extend in the film running direction and each includes a surface that faces the film running surface 11 and is open. The inside of the box-shaped body cover 2a is partitioned by a partition structural body 3a extending in a film width direction (hereinafter, it may be simply described as a "width direction") into two chambers 4a and 4b in this order from the upstream side in the film running direction. Likewise, the inside of the box-shaped body cover 2b is partitioned by a partition structural body 3b extending in the film width direction into two chambers 4c and 4d in this order from the upstream side in the film running direction. The chambers 4a, 4b, 4c, and 4d are provided with air discharge mechanisms 5a, 5b, 5c, and 5d, respectively. Each air discharge mechanism discharges air from the chamber. The air discharge mechanisms 5a, 5b, 5c, and 5d include at least openings each provided for the chambers 4a, 4b, 4c, and 4d, respectively, for discharging air, and an air discharge facility such as a blower that is connected to the openings and sucks air in the respective chambers through the corresponding openings. The openings and the blower may be directly connected or coupled with a duct interposed therebetween. An opening pattern of the opening may be any of a slit, a round hole, holes, polygonally shaped holes, uneven holes, a semicircle, and the like. The opening is preferably a perforated plate having a number of holes from points of view of increasing air discharge performance and easy manufacturing.

The box-shaped body cover 2a disposed above the film running surface 11 is used as a countermeasure against a case where a surrounding temperature of the tenter oven 10 is increased by a natural convection current of high temperature air 16 blowing from the tenter oven 10, resulting in deterioration of a work environment. The box-shaped body cover 2b disposed below the film running surface 11 is used as a countermeasure against a case where air 15 that blows in from the outside of the tenter oven 10 and has a lower temperature than that inside the tenter oven 10 flows in a lower portion of the tenter oven 10 by a natural convection current, thereby causing deterioration of heating performance in the lower portion, resulting in occurrence of temperature unevenness of the film in the tenter oven 10.

In the air flow controller 1 illustrated in FIGS. 1 and 2, the box-shaped body cover 2a is disposed above the film running surface 11 while the box-shaped body cover 2b is disposed below the film running surface 11. The box-shaped body cover may be disposed only above or below the film running surface 11 in accordance with the phenomena described above possibly occurring in the tenter oven 10. The box-shaped body covers 2a and 2b are preferably disposed both above and below the film running surface 11. The box-shaped body covers 2a and 2b disposed both above and below the film running surface 11 can further prevent fluctuation of an air flow between the tenter oven 10 and an external space 14, thereby stabilizing quality and increasing productivity.

The following describes an air flow when the air flow controller 1 performs desired operation. It is only required to prevent blowing from the outside of the tenter oven and blowing of high temperature air inside the tenter oven 10 to the outside of the tenter oven 10. The air flow is, thus, not limited to the following description.

Part of the air 15 blowing in from the outside is discharged by the air discharge mechanisms 5a and 5c in the chamber 4a and 4c, respectively, the chamber 4a and 4c being adjacent to the external space 14. The remaining air receives action of flow straightening and speed increase due to quick reduction of a flow path between the partition structural bodies 3a and 3b and the film running surface 11, and flows in the adjacent chambers 4b and 4d as a horizontal jet 17. Air (the horizontal jet 17) having flowed in the chambers 4b and 4d and the air 16 blowing from the tenter oven 10 collide with each other. The respective flows in the film running direction are canceled out. The respective flow directions are changed in the directions apart from the film running surface 11. The resulting air is discharged by the air discharge mechanisms 5b and 5d. In this way, the air 15 blowing in from the outside and the air 16 blowing from the tenter oven 10 are discharged by the air flow controller 1. This can prevent the air 15 blowing in from the outside from blowing in the tenter oven 10, and the air 16 blowing from the tenter oven 10 from blowing to the surrounding of the tenter oven 10.

As for the number of chambers separated by the partition structural bodies 3a and 3b of the box-shaped body covers 2a and 2b, respectively, two is still effective. Three or more chambers are, however, more effective. The number of chambers is not limited to any particular number. The number of chambers is, however, preferably 100 or less taking into consideration of the number of air discharge mechanisms. The number of chambers separated by the partition structural bodies 3a and 3b of the box-shaped body covers 2a and 2b, respectively, may differ above and below the film running surface 11.

The air discharge mechanism is disposed for each chamber in the box-shaped body covers 2a and 2b for discharging the air 15 blowing in from the outside and the air 16 blowing from the tenter oven 10. The respective air discharge mechanisms are preferably disposed for at least two chambers. In this case, the air discharge mechanisms are disposed side by side in the film running direction. The air discharge mechanisms disposed in at least two chambers allow the chamber apart from the tenter oven 10 to discharge more of the air 15 blowing in from the outside and the chamber close to the tenter oven 10 to discharge more of the air 16 blowing from the tenter oven 10. As a result, mixing of the air 15 blowing in from the outside and the air 16 blowing from the tenter oven 10 can be reduced. Reduction of mixing of the air 15 blowing in from the outside and the air 16 blowing from the tenter oven 10 can prevent that sublimate from the film included in the air 16 blowing from the tenter oven 10 precipitates due to temperature drop, thereby polluting the film surface to form foreign material defects. Reduction of mixing of the air 15 blowing in from the outside and the air 16 blowing from the tenter oven 10 can also prevent the air temperature from being unstable due to Mixing of air having different temperatures. For further reducing mixing of the air 15 blowing in from the outside and the air 16 blowing from the tenter oven 10, the air discharge mechanism is preferably disposed in more chambers to perform discharge by multiple stages. More preferably, the air discharge mechanism is disposed in all of the chambers. The box-shaped body cover may include a plurality of air discharge mechanisms for each chamber so as to adjust air discharge flow rates in the width direction and the film running direction.

At least one of the air discharge mechanisms 5a, 5b, 5c, and 5d of the respective chambers of the box-shaped body covers 2a and 2b preferably includes a flow rate adjustment mechanism that can adjust a discharge flow rate independently from the other air discharge mechanisms. Specifically, as illustrated in FIG. 1, in such a mechanism, the air discharge mechanisms 5a and 5b (5c and 5d) and a blower 7 are connected, and a damper 6 is attached to piping between the blower 7 and the corresponding air discharge mechanism, thereby adjusting a flow rate. Each air discharge mechanism may be individually connected to the blower and a flow rate may be adjusted by adjusting a setting of the blower. If the discharge flow rates of the air discharge mechanisms at the upstream and at the downstream in the film running direction can be independently adjusted, the discharge flow rates of the air discharge mechanisms at the upstream and at the downstream in the film running direction can be adjusted in accordance with the air 15 blowing in from the outside and the air 16 blowing from the tenter oven.

When an air flow passing through the air flow controller 1 in the film running direction blows from the tenter oven 10 to the external space 14 while air discharge from all of the air discharge mechanisms is stopped, the discharge flow rates of the air discharge mechanisms 5b and 5d on the upstream side in the air flow are preferably set larger than those of the air discharge mechanisms 5a and 5c on the downstream side. As a result of setting the discharge flow rates of the air discharge mechanisms 5b and 5d on the upstream side larger than those of the air discharge mechanisms 5a and 5c on the downstream side, the horizontal jet 17 flowing between the partition structural bodies 3a and 3b and the film running surface 11 and the air 16 blowing from the tenter oven 10 collide with each other, thereby reducing the air 16 blowing from the tenter oven 10. This makes it possible to reduce a loss of energy used for heating the air 16 blowing from the tenter oven 10. In contrast, when the discharge flow rates of the air discharge mechanisms 5b and 5d on the upstream side in the air flow are set smaller than those of the air discharge mechanisms 5a and 5c on the downstream side, the air 16 blowing from the tenter oven 10 is more increased than that in the state where air discharge from all of the air discharge mechanisms is stopped, resulting in energy used for heating the air 16 blowing from the tenter oven 10 being lost.

Likewise, when the air flow passing through the air flow controller 1 in the film running direction blows in the tenter oven 10 from the external space 14 while air discharge from all of the air discharge mechanisms is stopped, the discharge flow rates of the air discharge mechanisms 5a and 5c on the upstream side in the air flow are preferably set larger than those of the air discharge mechanisms 5b and 5d on the downstream side. As a result of setting the discharge flow rates of the air discharge mechanisms 5a and 5c on the upstream side in the air flow set to larger than those of the air discharge mechanisms 5b and 5d on the downstream side, the horizontal jet 17 flowing between the partition structural bodies 3a and 3b and the film running surface 11 and the air 15 blowing in from the outside collide with each other, thereby reducing air 15 blowing in from the outside. This makes it possible to reduce the air 15 blowing in the tenter oven 10 from the outside, thereby making it possible to reduce temperature unevenness of the film in the tenter oven 10. In contrast, when the discharge flow rates of the air discharge mechanisms 5a and 5c on the upstream side in the air flow are set smaller than those of the air discharge mechanisms 5b and 5d on the downstream side, the air 15 blowing from the outside is more increased than that in the state where air discharge from all of the air discharge mechanisms is stopped, resulting in the film heating performance in the tenter oven 10 being reduced to cause occurrence of temperature unevenness of the film.

The box-shaped body covers 2a and 2b each preferably have a dimension between 100 mm and 4000 mm inclusive in the film running direction taking into consideration of incidental facilities of an entrance 12 and an exit 13 of the tenter oven 10. The partition structural bodies 3a and 3b only need to have a shape for partitioning adjacent chambers to be separated. Any shapes such as a plate like shape, a semicircular shape, and a box like shape may be employed as the shape. In addition, for prevention of scratches due to contact with the film, a rotation body may be attached to the tip of each of the partition structural bodies 3a and 3b. A dimension of each of the partition structural bodies 3a and 3b in the film running direction may be selected in a range allowing the partition structural bodies 3a and 3b to be housed in the box-shaped body covers 2a and 2b, respectively.

Depending on production types or production conditions, sag or flying up of the film occurs. As a result, the film may be in contact with the partition structural bodies 3a and 3b. For maintaining a distance to the film running surface 11, it is preferable to adjust the distance between the film running surface 11 and the partition structural bodies 3a and 3b by elevating and lowering the partition structural bodies 3a and 3b. An example of the method for elevating and lowering is a method in which a jack is attached to each of the partition structural bodies 3a and 3b. For increasing a pressure loss in the inside of the air flow controller 1, it is preferable that the distance between the partition structural bodies 3a and 3b and the film running surface 11 is small. The contact due to the fluttering of the film needs to be avoided. The distance, thus, can be selected in a range between 10 mm and 200 mm inclusive. When the distance between the partition structural bodies 3a and 3b and the film running surface 11 is equal to or smaller than 200 mm, the action of flow straightening and speed increase to the horizontal jet 17 is increased due to quick reduction of a flow path between the partition structural bodies 3a and 3b and the film running surface 11. This makes it possible to effectively cause the horizontal jet 17 and the air 16 flowing from the tenter oven to collide with each other so as to cancel out the respective flows in the film running direction to change the flow directions to the directions apart from the film running surface 11. When the distance between the partition structural bodies 3a and 3b and the film running surface 11 is equal to or larger than 10 mm, the contact between the film and the partition structural bodies 3a and 3b due to the fluttering of the film can be avoided, thereby making it possible to prevent breakage of the film to increase productivity.

Figure 3:
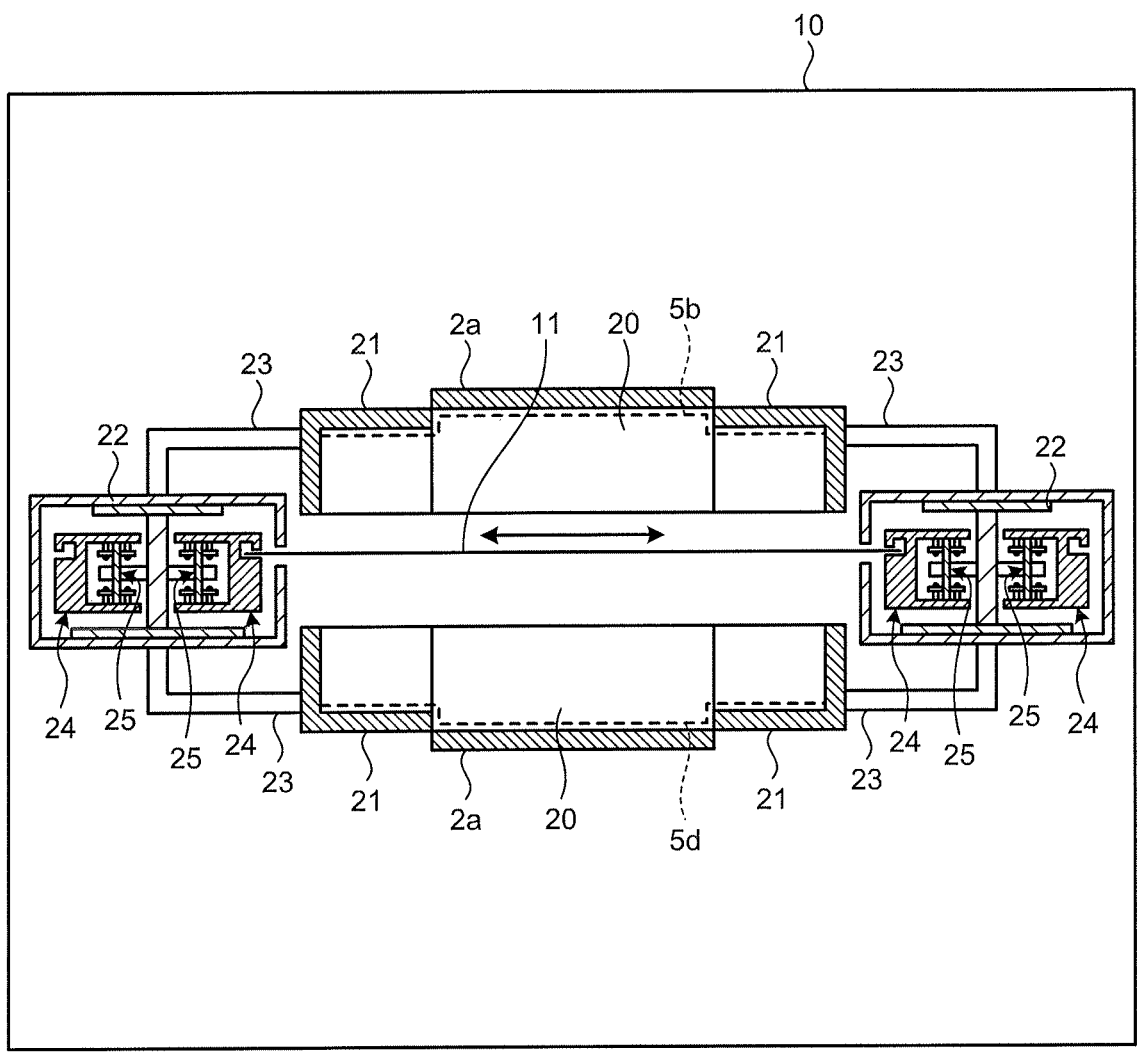
FIG. 3 is a schematic cross-sectional view of the air flow controller taken along line A2-A2 illustrated in FIG. 2.

The description continues with reference to FIG. 3. FIG. 3 is a schematic cross-sectional view of the air flow controller taken along line A2-A2 illustrated in FIG. 2. FIG. 3 is a cross-sectional view of the air flow controller by being cut with a plane parallel with the film running surface. FIG. 3 illustrates the structure excluding the dampers 6 and the blowers 7. For changing the film width in accordance with the production type, a distance between clips 24 gripping both ends of the film, a distance between two clip rails 25 that are provided at both ends of the film and cause the clips to run in the film running direction, and a distance between two clip rail covers 22 each covering the clip 24 and the clip rail 25 are generally widened or narrowed in the width direction (both-end-arrow in FIG. 3) in the tenter oven 10. When the distance between the clip rail covers 22 is widened while the box-shaped body covers 2a and 2b and the partition structural bodies 3a and 3b are between the clip rail covers 22, a gap between the air flow controller 1 and each of the clip rail covers 22 is increased, a bypass air flow occurs. As a result, an air flow control effect is reduced. The box-shaped body covers 2a and 2b and the partition structural bodies 3a and 3b, thus, preferably have an extraction-retraction mechanism in the width direction. Such an extraction-retraction mechanism in the width direction can keep the gap constant by extracting or retracting the air flow controller 1 in the width direction in accordance with the distance between the clip rail covers 22. An example of the extraction-retraction mechanism in the width direction for the partition structural bodies 3a and 3b of the box-shaped body covers 2a and 2b is illustrated in FIG. 3. In FIG. 3, a stationary unit 20 is provided at the center in the film width direction, movable units 21 that can be extracted or retracted in the film width direction are provided at both ends of the stationary unit 20 in the film width direction, and the movable units 21 move inside or outside the stationary unit 20.

The box-shaped body covers 2a and 2b include rail connection mechanisms 23 that each connects the movable unit 21 and the clip rail cover 22, for example, so as to cause the movable unit 21 to follow the movement of the clip rail cover 22 in the width direction.

First Modification

Figure 4:
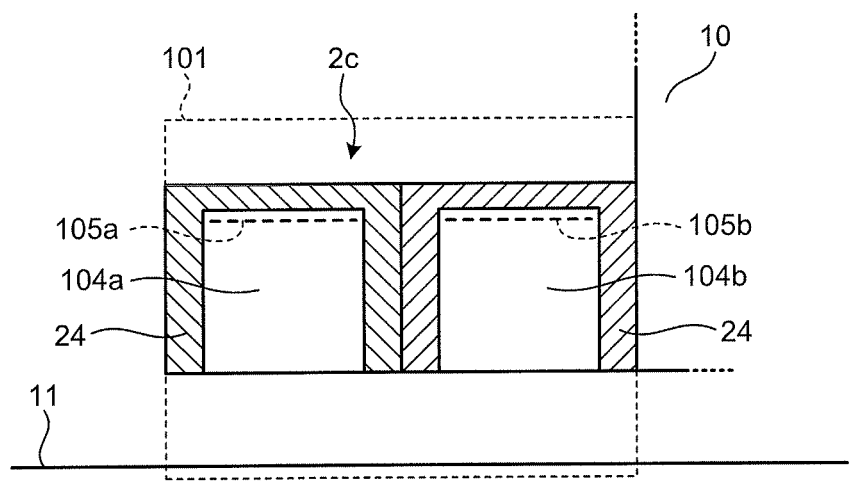
FIG. 4 is a schematic cross-sectional view of an air flow controller according to a first modification of the embodiment of the present invention in the film running direction.

The following describes an air flow controller according to a first modification of the present invention with reference to FIG. 4. An air flow controller 101 includes a box-shaped body cover 2c disposed to be adjacent to the upstream side of the tenter oven 10 in the film running direction. The box-shaped body cover 2c includes two box-shaped members 24 adjacent to each other. The box-shaped body cover 2c has two chambers 104a and 104b arranged above the film running surface side by side from the upstream side toward the downstream side in the film running direction. The chambers 104a and 104b each extend in the film width direction and each have a surface that faces in the film running direction and is open. The chambers 104a and 104b are disposed such that no gap is formed therebetween when viewed from a side adjacent to the film running surface. The chambers 104a and 104b include air discharge mechanisms 105a and 105b, respectively, each of which discharges air from the inside of the chamber.

Second Modification

Figure 5:
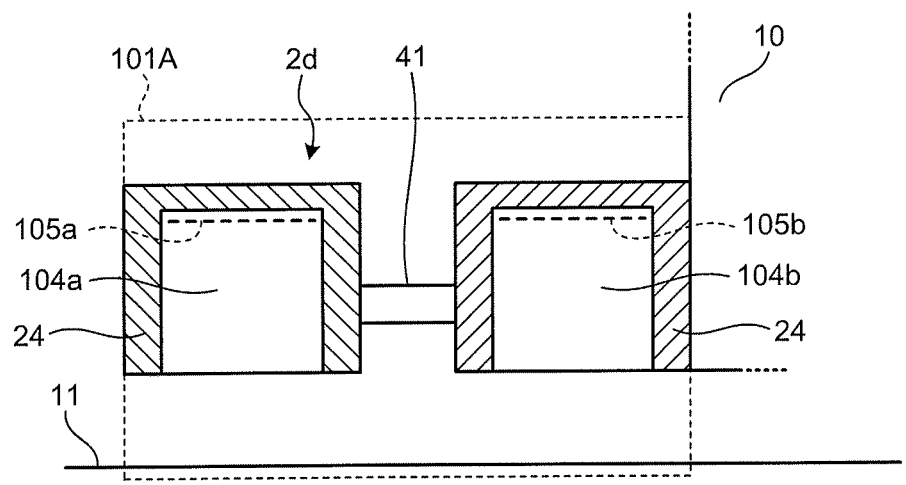
FIG. 5 is a schematic cross-sectional view of an air flow controller according to a second modification of the embodiment of the present invention in the film running direction.

The following describes an air flow controller according to a second modification of the present invention with reference to FIG. 5. An air flow controller 101A includes a box-shaped body cover 2d disposed to be adjacent to the upstream side of the tenter oven 10 in the film running direction. In the box-shaped body cover 2c illustrated in FIG. 4, the chambers 104a and 104b are disposed without a gap therebetween. In the box-shaped body cover 2d illustrated in FIG. 5, two box-shaped members 24, which are apart from each other, are connected by a connection member 41. When viewed from the side adjacent to the film running surface, a gap is provided between the adjacent chambers, i.e., a gap is provided between the chambers 104a and 104b, and the chambers 104a and 104b adjacent to each other are connected by the connection member 41.

The air flow controllers 101 and 101A illustrated in FIGS. 4 and 5, respectively, each include two chambers 104a and 104b. Three or more chambers arranged side by side in the film running direction may be included. The number of chambers may differ above and below the film running surface 11. The second air flow controller illustrated in FIG. 4 includes the two chambers 104a and 104b disposed above the film running surface 11. In the same manner as the first air flow controller described above, the chambers 104a and 104b may be disposed both above and below the film running surface 11, or only above or below the film running surface 11. Preferably, the same number of chambers are disposed both above and below the film running surface 11.

In the air flow controller 1 according to the embodiment of the present invention, a plurality of chambers are separated by partitioning the inside of a single box-shaped body cover by a single or a plurality of partition structural bodies. In the air flow controllers 101 and 101A according to the first modification and the second modification, respectively, a plurality of individual chambers are arranged without a gap therebetween. Those, thus, have the essentially same structure as the embodiment. Various embodiments of the air flow controller 1 can also be applied to the air flow controllers 101 and 101A.

EXAMPLES

The following describes the present invention in detail by examples. The present invention is not limitedly interpreted by the following examples.

First Example

An evaluation method of an effect of the present invention is described. A numerical analysis model modeling the air flow controller according to the present invention and the chambers included in the tenter oven body was created. An air flow control performance was evaluated by numerically calculating the numerical analysis model.

Figure 6:
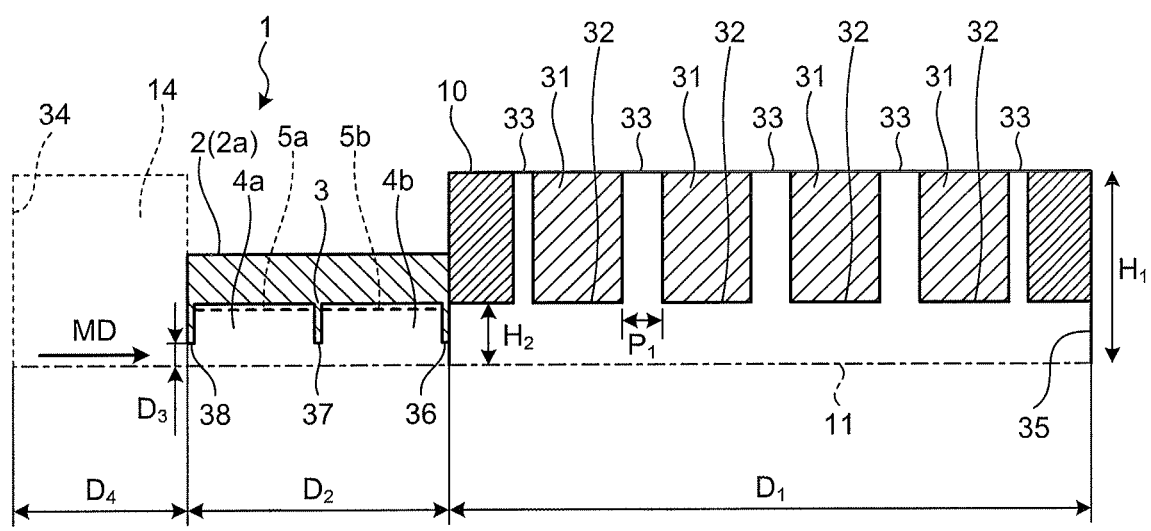
FIG. 6 is a cross-sectional view in the film running direction of the air flow controller used in examples of the present invention.

FIG. 6 is a cross-sectional view in the film running direction of the air flow controller used in the examples of the present invention. FIG. 6 is a cross-sectional view of the air flow controller 1 and the tenter oven 10 by being cut with a plane perpendicular to the film running surface 11. FIG. 6 illustrates the structure of an upper half of the air flow controller 1 and the tenter oven 10 out of upper and lower portions separated by the film running surface 11 as the separation boundary. In calculating internal air flows in the air flow controller 1 and the tenter oven 10, the air flow controller 1, the tenter oven 10, and the external space 14 are assumed to have symmetrical shapes with respect to the film running surface 11, and calculation is performed on the upper half portion for saving calculation resources. For evaluating the air flow performance of the air flow controller 1, it is sufficient to study an air flow in the longitudinal cross-sectional surface in the film running direction. A 2D model based on the surface was created.

The dimensions of the respective structures were set as follows. In the tenter oven 10, a length $D_1$ in the film running direction was set to 1.5 m and a height $H_1$ was set to 0.65 m. In the tenter oven 10, four air blowing nozzles 31 were disposed. The dimension of the air blowing nozzle 31 in the film running direction was set to 0.2 m. The respective air blowing nozzles 31 were arranged at equal intervals of a pitch $P_1$ of 0.3 m. A distance $H_2$ to the film running surface 11 was set to 0.15 m. The air flow controller 1 adjacent to the entrance of the tenter oven 10 includes a single partition structural body 3 that separates the box-shaped body cover 2 into two chambers 4a and 4b. The dimension of the chamber in the film running direction was set to 0.25 m and the height was set to 0.15 m. A length $D_2$ of the air flow controller 1 in the film running direction was set to 0.6 m. As for the chambers 4a and 4b and the partition structural body 3 of the air flow controller 1, a distance $D_3$ between the film running surface 11 and an entrance 38 of the air flow controller 1 was set to 0.05 m. As for the external space 14, a length $D_4$ in the film running direction was set to 0.4 m and the height was set to 0.65 m, which is the same as the height (height $H_1$) of the tenter oven 10. The direction indicated by MD is the film running direction.

On the surface facing the film running surface 11 of the air blowing nozzle 31 of the tenter oven 10 was provided with a nozzle opening 32 having a width of 0.01 m. A boundary condition was set in which the nozzle openings 32 blow air at a flow velocity of 20 m/s. For suction units 33, a boundary condition was set in which the suction units 33 discharge air having the same flow rate as air blown from the nozzle openings 32. An external boundary 34 of the analysis space and an internal boundary 35 of the tenter oven 10 were set as a pressure boundary. The boundary condition of the external boundary 34 was set to atmospheric pressure (0.1

MPa). The boundary condition of the internal boundary 35 of the tenter oven 10 was set to atmospheric pressure plus 5 Pa.

Physical properties of a fluid, which was assumed as dry air having atmospheric pressure at a temperature of 100° C., were set as follows: the density was 0.93 kg/m$^3$, the viscosity was 2.2×10$^{-5}$ Pa·s, the specific heat was 1012 J/(kg·K), and the thermal conductivity was 0.031 W/(m·K).

In the analysis, steady calculation was performed using "STAR-CCM" (manufactured by IDAJ Co., LTD), which is commercially available general-purpose thermal fluid analysis software. A k–ε turbulence model was used for handling turbulence. A wall law was used for handling a turbulence boundary layer near the wall.

The software described above analyzes Navier-Stokes equations, which are fluid motion equations, by a finite volume method. Any thermal fluid analysis software can be used that can perform the same analysis.

As an index of the effect of the air flow controller 1, an average air flow velocity was used. The average air flow velocity is the average of velocity components in the film running direction with respect to the perpendicular line to the film running surface 11 at each of the positions of an entrance 36 of the tenter oven 10, an inside 37 of the air flow controller 1, and the entrance 38 of the air flow controller 1, which are illustrated in FIG. 6.

When discharge of air from the air discharge mechanism 5a adjacent to the external space 14 and the air discharge mechanism 5b adjacent to the tenter oven 10 is stopped under this condition, air flows from the tenter oven 10 to the external space 14 via the air flow controller 1 at an average flow velocity of 3.0 m/s (refer to a first comparative example).

Each air flow velocity of the air discharge mechanism 5a adjacent to the external space 14 and the air discharge mechanism 5b adjacent to the tenter oven 10 was set to 0.40 m/s. The air flow rate is indicated using an air flow velocity value as a two-dimensional approximation technique. The effects of the air flow controller are illustrated in Table 1 while the setting conditions are illustrated in Table 2. In table 1, plus (+) indicates the direction from the entrance 36 of the tenter oven 10 to the entrance 38 of the air flow controller while minus (−) indicates the direction from the entrance 38 of the air flow controller 1 to the entrance 36 of the tenter oven 10.

TABLE 1

|  | Entrance 38 of air flow controller | Inside 37 of air flow controller | Entrance 36 of tenter oven |
|---|---|---|---|
| First example | −0.8 m/s | +1.2 m/s | +3.2 m/s |
| Second example | −0.7 m/s | +2.5 m/s | +3.3 m/s |
| Third example | −1.0 m/s | −0.2 m/s | +3.0 m/s |
| First comparative example | +3.0 m/s | +3.0 m/s | +3.0 m/s |
| Second comparative example | +1.0 m/s | +1.0 m/s | +5.0 m/s |
| Third comparative example | +0.8 m/s | +4.8 m/s | +4.8 m/s |

TABLE 2

|  | Air discharge setting of air discharge mechanism 5a | Air discharge setting of air discharge mechanism 5b |
|---|---|---|
| First example | 0.40 m/s | 0.40 m/s |
| Second example | 0.64 m/s | 0.16 m/s |
| Third example | 0.16 m/s | 0.64 m/s |
| First comparative example | 0.00 m/s | 0.00 m/s |
| Second comparative example | 0.00 m/s | 0.80 m/s |
| Third comparative example | 0.80 m/s | 0.00 m/s |

Air blown from the tenter oven 10 to the air flow controller 1 passes the entrance 36 of the tenter oven 10 at an average flow velocity of 3.2 m/s. Part of the air blown from the tenter oven 10 is discharged by the air discharge mechanism 5b provided to the chamber 4b adjacent to the tenter oven 10 while the remaining air, which has not been discharged, receives action of flow straightening and speed increase due to quick reduction of the flow path, in the inside 37 of the air flow controller 1 between the partition structural body 3 and the film running surface 11, and flows in the chamber 4a adjacent to the external space 14 at an average flow velocity of 1.2 m/s as a horizontal jet. The discharge of air by the air discharge mechanism 5a provided to the chamber 4a adjacent to the external space 14 causes occurrence of air blown from the external space 14. The air blown from the external space 14 passes the entrance 38 of the air flow controller at an average flow velocity of 0.8 m/s, and collides with the horizontal jet flowing in from the chamber 4b adjacent to the tenter oven 10. Flows in the film running direction of air having collided with each other are canceled out. The flowing directions change in the directions apart from the film running surface 11. Resulting air is discharged by the air discharge mechanism 5a.

As a result, air flowing in from the external space 14 and air blowing from the tenter oven 10 are discharged to the air flow controller 1, thereby reducing air blowing from the tenter oven 10 to the external space 14 and air blowing in the tenter oven 10 from the external space 14.

Second Example

A second example used the same calculation model as the first example. The second example is the same as the first example except for that the air flow velocity of the air discharge mechanism 5a adjacent to the external space 14 was set to 0.64 m/s while the air flow velocity of the air discharge mechanism 5b adjacent to the tenter oven 10 was set to 0.16 m/s.

As illustrated in Table 1, air blown from the tenter oven 10 to the air flow controller 1 passes the entrance 36 of the tenter oven 10 at an average flow velocity of 3.3 m/s. Part of the air blown from the tenter oven 10 is discharged by the air discharge mechanism 5b provided to the chamber 4b adjacent to the tenter oven 10. The remaining air, which has not been discharged, receives action of flow straightening and speed increase due to quick reduction of the flow path in the inside 37 of the air flow controller 1 between the partition structural body 3 and the film running surface 11, and flows in the chamber 4a adjacent to the external space at an average flow velocity of 2.5 m/s as a horizontal jet. The discharge of air by the air discharge mechanism 5a provided to the chamber 4a adjacent to the external space 14 causes occurrence of air blown from the external space 14. The air blown from the external space 14 passes the entrance 38 of the air flow controller 1 at an average flow velocity of 0.7 m/s, and collides with the horizontal jet flowing in from the chamber 4b adjacent to the tenter oven 10. Flows in the film running direction of air having collided with each other are canceled out. The flowing directions change in the directions apart from the film running surface 11. Resulting air is discharged by the air discharge mechanism 5a.

As a result, air flowing in from the external space 14 and air blowing from the tenter oven 10 are discharged to the air flow controller 1, thereby reducing air blowing from the tenter oven 10 to the external space 14 and air blowing in the tenter oven 10 from the external space 14.

The air flow velocity of the air discharge mechanism 5b on the upstream side in the air flow in the state where discharge of air from all of the air discharge mechanisms is stopped is smaller than that in the air discharge mechanism 5a on the downstream side. Air blowing from the entrance 36 of the tenter oven 10 was increased by 0.1 m/s than the first example. The loss of energy used for heating air blowing from the tenter oven 10 was, thus, increased.

Third Example

A third example used the same calculation model as the first example. The third example is the same as the first example except for that the air flow velocity of the air discharge mechanism 5a adjacent to the external space 14 was set to 0.16 m/s while the air flow velocity of the air discharge mechanism 5b adjacent to the tenter oven 10 was set to 0.64 m/s.

As illustrated in Table 1, air blown from the tenter oven 10 to the air flow controller 1 passes the entrance 36 of the tenter oven 10 at an average flow velocity of 3.0 m/s. The horizontal jet flowing in the chamber 4b adjacent to the tenter oven 10 from the chamber 4a adjacent to the external space 14 at an average flow velocity of 0.2 m/s and air blowing from the tenter oven 10 collide with each other. Flows in the film running direction of air having collided with each other are canceled out. The flowing directions change in the directions apart from the film running surface 11. Resulting air is discharged by the air discharge mechanism 5b. Air blown from the external space 14 passes the entrance 38 of the air flow controller 1 at an average flow velocity of 1.0 m/s and part of the air after passing the entrance 38 is discharged by the air discharge mechanism 5a of the chamber 4a adjacent to the external space 14.

As a result, air flowing in from the external space 14 and air blowing from the tenter oven 10 are discharged to the air flow controller 1, thereby reducing air blowing from the tenter oven 10 to the external space 14 and air blowing in the tenter oven 10 from the external space 14.

The air flow velocity of the air discharge mechanism 5b on the upstream side in the air flow in the state where discharge of air from all of the air discharge mechanisms is stopped is larger than that in the air discharge mechanism 5a on the downstream side. Air blowing from the entrance 36 of the tenter oven 10 was reduced by 0.2 m/s than the first example. The loss of energy used for heating air blowing from the tenter oven 10 was, thus, reduced.

First Comparative Example

A first comparative example used the same calculation model as the first example. The first comparative example is the same as the first example except for that each air flow velocity of the air discharge mechanism 5a adjacent to the external space 14 and the air discharge mechanism 5b adjacent to the tenter oven 10 was set to 0.0 m/s.

As illustrated in Table 1, air blown from the tenter oven 10 to the air flow controller 1 passes the entrance 36 of the tenter oven 10 at an average flow velocity of 3.0 m/s. Air blowing from the tenter oven 10 is not discharged by the air discharge mechanism 5b provided to the chamber 4b adjacent to the tenter oven 10 and passes the inside 37 of the air flow controller 1 at an average air flow velocity of 3.0 m/s and flows in the chamber 4a adjacent to the external space 14. Air having flowed in the chamber 4a passes the entrance 38 of the air flow controller 1 at an average air flow velocity of 3.0 m/s and blows to the external space 14. In the first comparative example, air blown from the tenter oven 10 blew to the external space 14.

In the first comparative example, the air discharge mechanism of the air flow controller 1 does not function, resulting in no occurrence of the horizontal jet colliding with air flowing in the air flow controller 1. As a result, no action occurs that collides with the flow flowing in the air flow controller 1, cancels out the flow in the film running direction, and changes the direction of the flow to the direction apart from the film running surface 11, thereby making it impossible to prevent air blowing from the tenter oven 10 from blowing to the external space 14.

Second Comparative Example

A second comparative example used the same calculation model as the first example. The second comparative example is the same as the first example except for that the air flow velocity of the air discharge mechanism 5a adjacent to the external space 14 was set to 0.0 m/s while the air flow velocity of the air discharge mechanism 5b adjacent to the tenter oven 10 was set to 0.8 m/s.

As illustrated in Table 1, air blowing from the tenter oven 10 to the air flow controller 1 passes the entrance 36 of the tenter oven 10 at an average air flow velocity of 5.0 m/s, which is increased by 2.0 m/s than that in the first comparative example.

Part of the air blown from the tenter oven 10 is discharged by the air discharge mechanism 5b of the chamber 4b adjacent to the tenter oven 10, the resulting air passes the inside 37 of the air flow controller 1 at an average air flow velocity of 1.0 m/s and flows in the chamber 4a adjacent to the external space 14. Air having flowed in the chamber 4a passes the entrance 38 of the air flow controller 1 at an average air flow velocity of 1.0 m/s and blows to the external space 14. In the second comparative example, the air 16 blown from the tenter oven 10 blew to the external space 14.

In the second comparative example, air is discharged from the air discharge mechanism 5b while no air is discharged from the air discharge mechanism 5a, resulting in no occurrence of the horizontal jet colliding with air having flowed in the air flow controller 1. As a result, no action occurs that collides with the flow flowing in the air flow controller 1, cancels out the flow in the film running direction, and changes the direction of the flow to the direction apart from the film running surface 11, thereby making it impossible to prevent air blowing from the tenter oven 10 from blowing to the external space 14.

Third Comparative Example

A third comparative example used the same calculation model as the first example. The third comparative example is the same as the first example except for that the air flow velocity of the air discharge mechanism 5*a* adjacent to the external space 14 was set to 0.8 m/s while the air flow velocity of the air discharge mechanism 5*b* adjacent to the tenter oven 10 was set to 0.0 m/s.

As illustrated in Table 1, air blowing from the tenter oven 10 to the air flow controller 1 passes the entrance 36 of the tenter oven 10 at an average air flow velocity of 4.8 m/s, which is increased by 1.8 m/s than that in the first comparative example. Air blown from the tenter oven 10 is not discharged by the air discharge mechanism 5*b* of the chamber 4*b* adjacent to the tenter oven 10, passes the inside 37 of the air flow controller 1 at an average air flow velocity of 4.8 m/s, and flows in the chamber 4*a* adjacent to the external space 14. Air having flowed in the chamber 4*a* passes the entrance 38 of the air flow controller 1 at an average air flow velocity of 0.8 m/s, and blows to the external space 14. In the third comparative example, air blown from the tenter oven 10 blew to the external space 14.

In the third comparative example, air is discharged from the air discharge mechanism 5*a* while no air is discharged from the air discharge mechanism 5*b*, resulting in no occurrence of the horizontal jet colliding with air having flowed in the air flow controller 1. As a result, no action occurs that collides with the flow flowing in the air flow controller 1, cancels out the flow in the film running direction, and changes the direction of the flow to the direction apart from the film running surface 11, thereby making it impossible to prevent air blowing from the tenter oven from blowing to the external space 14.

INDUSTRIAL APPLICABILITY

The air flow controller and the manufacturing method of a stretched film according to the present invention can reduce temperature unevenness of the film and manufacture a stretched film made of thermoplastic resin having uniform characteristics and a uniform thickness in the film width direction, can also reduce consumption energy necessary for keeping a temperature in heating the film up to a desired temperature, and are useful in preventing that high temperature air inside the tenter oven blows to the outside, resulting in deterioration of a work environment of around the tenter oven and deterioration of productivity of the film.

REFERENCE SIGNS LIST 1, 101 air flow controller
2*a*, 2*b* box-shaped body cover
3, 3*a*, 3*b* partition structural body
4*a*, 4*b*, 4*c*, 4*d* chamber
104*a*, 104*b* chamber
5*a*, 5*b*, 5*c*, 5*d* air discharge mechanism
105*a*, 105*b* air discharge mechanism
205*a*, 205*b* air discharge mechanism
6 damper
7 blower
10 tenter oven
11 film running surface
12, 36, 38 entrance
13 exit
14 external space
15 air blowing in from outside
16 outflow of air
17 horizontal jet
20 stationary unit
21 movable unit
22 clip rail cover
23 rail connection mechanism
24 clip
25 clip rail
31 air blowing nozzle
32 nozzle opening
33 suction unit
34 external boundary of analysis apace
35 internal boundary
37 inside
41 connection member

The invention claimed is:

1. A manufacturing apparatus for a stretched film, wherein:
the manufacturing apparatus comprises an air flow controller and a tenter oven,
the air flow controller includes a box-shaped body cover that is disposed above and/or below a film running surface to be adjacent to an upstream side of an entrance of the tenter oven in a film running direction and/or a downstream side of an exit of the tenter oven in the film running direction,
the tenter oven includes the entrance into which a film is conveyed and the exit from which the film is taken out, and the tenter oven has a preheating process, a stretching process, a thermal fixation process and a cooling process,
the box-shaped body cover extends in the film running direction and has a surface facing the film running surface and being open,
the box-shaped body cover includes at least one partition structural body in the box-shaped body cover, the partition structural body extends in a width direction of the film and separates inside of the box-shaped body cover into a plurality of chambers, and
each of at least two of the chambers is provided with an air discharge mechanism configured to discharge air in a corresponding chamber.

2. The manufacturing apparatus for a stretched film according to claim 1, wherein the air flow controller further comprises a mechanism configured to elevate and lower the partition structural body.

3. The manufacturing apparatus for a stretched film according to claim 1, wherein the airflow controller further comprises a mechanism configured to extract and retract the box-shaped body cover and the partition structural body in the width direction of the film.

4. A manufacturing apparatus for a stretched film, wherein:
the manufacturing apparatus comprises an air flow controller and a tenter oven,
the air flow controller comprises a plurality of chambers that are disposed above and/or below a film running surface to be adjacent to an upstream side of an entrance of the tenter oven in a film running direction and/or a downstream side of an exit of the tenter oven in the film running direction,
the tenter oven includes the entrance into which a film is conveyed and the exit from which the film is taken out, and the tenter oven has a preheating process, a stretching process, a thermal fixation process and a cooling process,
the chambers are arranged in the film running direction,
each chamber has a surface facing the film running surface and being open, and extends in a width direction of the film, the chambers are arranged without a gap between adjacent chambers when viewed from a side adjacent to the film running surface, and each of at least two of the chambers is provided with an air discharge mechanism configured to discharge air from inside of a corresponding chamber.

5. The manufacturing apparatus for a stretched film according to claim 4, wherein each chamber includes a mechanism configured to elevate and lower a part of the chamber facing an adjacent chamber.

6. The manufacturing apparatus for a stretched film according to claim 4, wherein the air flow controller further comprises a mechanism configured to extract and retract the air flow controller in the width direction of the film.

7. The manufacturing apparatus for a stretched film according to claim 1, wherein at least one of the air discharge mechanisms includes a flow rate adjustment mechanism that is capable of adjusting a discharge flow rate independently from another air discharge mechanism of the air discharge mechanisms.

8. A manufacturing method of a stretched film, the manufacturing method comprising:
    passing a film through a tenter oven and the air flow controller according to claim 1, the air flow controller being disposed to be adjacent to an upstream side of an entrance of the tenter oven in a film running direction and/or a downstream side of an exit of the tenter oven in the film running direction;
    at the air flow controller, discharging air inside the chamber by the air discharge mechanism; and
    at the tenter oven, stretching a running film while heating the running film.

9. The manufacturing method of a stretched film according to claim 8, wherein a discharge flow rate of the air discharge mechanism on an upstream side in an air flow is larger than a discharge flow rate of the air discharge mechanism on a downstream side in the air flow, the air flow being a flow that an air flows in the air flow controller when the film passes the air flow controller in a state where discharge of air by all of the air discharge mechanisms is stopped.

10. The manufacturing apparatus for a stretched film according to claim 4, wherein at least one of the air discharge mechanisms includes a flow rate adjustment mechanism that is capable of adjusting a discharge flow rate independently from another air discharge mechanism of the air discharge mechanisms.

11. A manufacturing method of a stretched film, the manufacturing method comprising:
    passing a film through a tenter oven and the air flow controller according to claim 4, the air flow controller being disposed to be adjacent to an upstream side of an entrance of the tenter oven in a film running direction and/or a downstream side of an exit of the tenter oven in the film running direction;
    at the air flow controller, discharging air inside the chamber by the air discharge mechanism; and
    at the tenter oven, stretching a running film while heating the running film.

12. The manufacturing method of a stretched film according to claim 11, wherein a discharge flow rate of the air discharge mechanism on an upstream side in an air flow is larger than a discharge flow rate of the air discharge mechanism on a downstream side in the air flow, the air flow being a flow that an air flows in the air flow controller when the film passes the air flow controller in a state where discharge of air by all of the air discharge mechanisms is stopped.

* * * * *